(12) United States Patent
Hsu et al.

(10) Patent No.: US 10,511,030 B2
(45) Date of Patent: Dec. 17, 2019

(54) ANTI-CORROSION STRUCTURE AND FUEL CELL EMPLOYING THE SAME

(71) Applicant: INDUSTRIAL TECHNOLOGY RESEARCH INSTITUTE, Hsinchu (TW)

(72) Inventors: Chia-Cheng Hsu, Zhudong Township (TW); Hsu-Shen Chu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 318 days.

(21) Appl. No.: 15/723,848

(22) Filed: Oct. 3, 2017

(65) Prior Publication Data

US 2018/0151891 A1     May 31, 2018

(30) Foreign Application Priority Data

Nov. 28, 2016 (TW) .............................. 105139052 A
Aug. 22, 2017 (TW) .............................. 106128395 A

(51) Int. Cl.
*H01M 8/0208* (2016.01)
*H01M 8/0228* (2016.01)

(52) U.S. Cl.
CPC ....... *H01M 8/0208* (2013.01); *H01M 8/0228* (2013.01)

(58) Field of Classification Search
None
See application file for complete search history.

(56) References Cited

U.S. PATENT DOCUMENTS

| | | |
|---|---|---|
| 6,372,376 B1 | 4/2002 | Fronk et al. |
| 6,379,476 B1 | 4/2002 | Tarutani et al. |
| 6,686,639 B1 | 2/2004 | Tsai |
| 6,749,959 B2 | 6/2004 | Nakata et al. |
| 6,989,213 B2 | 1/2006 | Kaiser et al. |
| 7,150,918 B2 | 12/2006 | Brady |
| 7,211,346 B2 | 5/2007 | Brady et al. |
| 7,267,869 B2 | 9/2007 | Kriksunov |
| 7,482,083 B2 | 1/2009 | Iqbal et al. |
| 7,575,826 B2 | 8/2009 | Mantese et al. |
| 7,575,827 B2 | 8/2009 | Eddy et al. |
| 7,674,546 B2 | 3/2010 | Kim et al. |

(Continued)

FOREIGN PATENT DOCUMENTS

| | | |
|---|---|---|
| CN | 101752575 A | 6/2010 |
| JP | 1-95893 A | 4/1989 |

(Continued)

OTHER PUBLICATIONS

Taiwanese Notice of Allowance and Search Report, dated Sep. 17, 2018, for Taiwanese Application No. 106128395.

(Continued)

*Primary Examiner* — Wyatt P McConnell
(74) *Attorney, Agent, or Firm* — Birch, Stewart, Kolasch & Birch, LLP

(57) ABSTRACT

An anti-corrosion structure and a fuel cell employing the same are provided. The anti-corrosion structure includes an aluminum layer, a first anti-corrosion layer, and an intermediate layer disposed between the aluminum layer and the first anti-corrosion layer. In particular, the first anti-corrosion layer can be a nickel-tin-containing alloy layer, and the intermediate layer can be a nickel-tin-aluminum-containing alloy layer.

20 Claims, 5 Drawing Sheets

(56) References Cited

U.S. PATENT DOCUMENTS

| | | |
|---|---|---|
| 7,699,916 B1 | 4/2010 | Carter et al. |
| 7,700,212 B2 | 4/2010 | Abd Elhamid et al. |
| 7,829,194 B2 | 11/2010 | Brady et al. |
| 7,871,737 B2 | 1/2011 | Washima et al. |
| 7,879,389 B2 | 2/2011 | Vyas et al. |
| 7,914,948 B2 | 3/2011 | Lyo et al. |
| 7,947,409 B2 | 5/2011 | Park et al. |
| 7,951,510 B2 | 5/2011 | Ji et al. |
| 7,968,251 B2 | 6/2011 | Vyas et al. |
| 8,541,291 B2 | 9/2013 | Furman et al. |
| 2002/0001743 A1 | 1/2002 | Davis |
| 2003/0170526 A1 | 9/2003 | Hodgson et al. |
| 2003/0228512 A1 | 12/2003 | Vyas et al. |
| 2004/0005502 A1 | 1/2004 | Schlag |
| 2004/0247978 A1 | 12/2004 | Shimamune |
| 2005/0102819 A1 | 5/2005 | Lee et al. |
| 2006/0019142 A1 | 1/2006 | Abd Elhamid et al. |
| 2006/0088755 A1 | 4/2006 | Tawfik et al. |
| 2006/0093888 A1 | 5/2006 | Vyas et al. |
| 2006/0257555 A1 | 11/2006 | Brady et al. |
| 2007/0003813 A1 | 1/2007 | Vyas et al. |
| 2007/0264540 A1 | 11/2007 | Weil et al. |
| 2008/0038619 A1 | 2/2008 | Takagi et al. |
| 2008/0265430 A1 | 10/2008 | Ishihara |
| 2009/0087716 A1 | 4/2009 | Abd Elhamid et al. |
| 2009/0176142 A1 | 7/2009 | Abd Elhamid et al. |
| 2009/0214927 A1 | 8/2009 | Dadheech et al. |
| 2009/0280386 A1 | 11/2009 | Buck et al. |
| 2010/0015499 A1 | 1/2010 | Lyo et al. |
| 2010/0032306 A1 | 2/2010 | Abd Elhamid et al. |
| 2010/0132842 A1 | 6/2010 | Lee et al. |
| 2010/0136366 A1 | 6/2010 | Sasaoka |
| 2010/0178579 A1 | 7/2010 | Wischmann et al. |
| 2010/0279209 A1 | 11/2010 | Jeong et al. |
| 2010/0291464 A1 | 11/2010 | Abd Elhamid et al. |
| 2010/0304267 A1 | 12/2010 | Mikhail et al. |
| 2011/0065024 A1 | 3/2011 | Jeon et al. |
| 2011/0070529 A1 | 3/2011 | Dadheech et al. |
| 2014/0308538 A1 | 10/2014 | Chen |
| 2015/0056390 A1 | 2/2015 | Miyai et al. |

FOREIGN PATENT DOCUMENTS

| | | |
|---|---|---|
| JP | 6-267550 A | 9/1994 |
| JP | 11-126620 A | 5/1999 |
| JP | 2003-331859 A | 11/2003 |
| JP | 2005-298858 A | 10/2005 |
| JP | 2005-533659 A | 11/2005 |
| JP | 2006-503709 A | 2/2006 |
| JP | 2010-218899 A | 9/2010 |
| JP | 2015-56270 A | 3/2015 |
| KR | 10-0394777 B1 | 11/2003 |
| KR | 10-2010-0043765 A | 4/2010 |
| TW | 201136014 A | 10/2011 |
| TW | I411703 B | 10/2013 |
| TW | I520387 B | 2/2016 |
| WO | WO 00/03446 A1 | 1/2000 |
| WO | WO 2004/011188 A1 | 2/2004 |
| WO | WO 2010/061694 A1 | 6/2010 |
| WO | WO 2010/077065 A2 | 7/2010 |
| WO | WO 2001/144457 A3 | 12/2010 |

OTHER PUBLICATIONS

Barranco et al. "Influence of CrN-coating thickness on the corrosion resistance behaviour of aluminium-based bipolar plates" Elsevier Journal of Power Sources 196 (2011) pp. 4283-4289.

Frangini et al. "Anti-Corrosion Methods for Fuel Cell Metal Bipolar Plates: A Review of Recent Patent Literature" Recent Patents on Corrosion Science (2011) 1 pp. 93-107.

Taherian "A review of composite and metallic bipolar plates in proton exchange membrane fuel cell: Materials, fabrication, and material selection" Elsevier Journal of Power Sources 265 (2014) pp. 370-390.

Japanese Notice of Allowance dated Mar. 19, 2019, for Japanese Application No. 2017-226195.

ANTI-CORROSION STRUCTURE AND FUEL CELL EMPLOYING THE SAME

CROSS REFERENCE TO RELATED APPLICATIONS

The application is based on, and claims priority from, Taiwan Application Serial Number 105139052, filed on Nov. 28, 2016, and Taiwan Application Serial Number 106128395, filed on Aug. 22, 2017, the disclosure of which is hereby incorporated by reference herein in its entirety.

TECHNICAL FIELD

The technical field relates to an anti-corrosion structure and a fuel cell employing the same.

BACKGROUND

Fuel cells are energy converting devices with high efficiency and low pollution. In the fuel cell, the fuel gas flow (such as hydrogen) is supplied to the anode and the oxidant is supplied to the cathode. Therefore, the chemical energy of the fuel gas is converted into electric energy as a result of an electrochemical redox reaction.

The bipolar plate is one of the key components of a fuel cell. The bipolar plate separates the fuel gas flow from the atmospheric gas flow in order to avoid an explosion hazard resulting from the combination of the fuel gas flow and the atmospheric gas flow. The stainless steel bipolar plate has the advantage of high corrosion resistance, but suffers the disadvantages of increased cost and weight. The aluminum bipolar plate has the advantages of light weight, high strength and low manufacturing cost, but the adhesive strength between the aluminum substrate and the anti-corrosion layer is poor, resulting in peeling of the coating.

Accordingly, a novel bipolar plate structure is still called for.

SUMMARY

According to embodiments of the disclosure, the disclosure provides an anti-corrosion structure. The anti-corrosion structure includes an aluminum layer, a first anti-corrosion layer and an intermediate layer, wherein the first anti-corrosion layer can be a nickel-tin-containing alloy layer, and the intermediate layer can be disposed between the aluminum layer and the first anti-corrosion layer. In particular, the intermediate layer can be a nickel-tin-aluminum-containing alloy layer.

According to other embodiments of the disclosure, the disclosure also provides a fuel cell. The fuel cell can include a bipolar plate, wherein the bipolar plate can be the aforementioned anti-corrosion structure.

A detailed description is given in the following embodiments with reference to the accompanying drawings.

DETAILED DESCRIPTION

Figure 1:
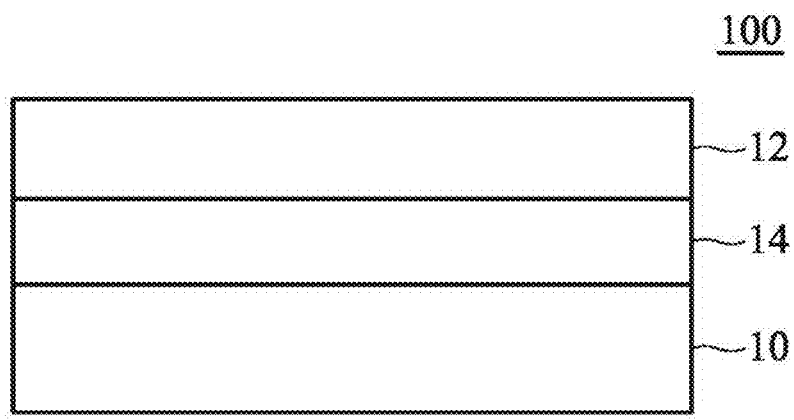
FIG. 1 is a schematic view of an anti-corrosion structure according to an embodiment of the disclosure.

In the following detailed description, for the purposes of explanation, numerous specific details are set forth in order to provide a thorough understanding of the disclosed embodiments, and wherein the illustrated structures are not necessarily drawn to scale. It will be apparent, however, that one or more embodiments may be practiced without these specific details. In other instances, well-known structures and devices are shown schematically in order to simplify the drawing.

The disclosure provides an anti-corrosion structure, and the anti-corrosion structure can serve a bipolar plate for use in a fuel cell. By optimizing the conditions of the process (such as temperature and pressure) of the formation of the anti-corrosion structure, an intermediate layer can be formed between the first anti-corrosion layer (such as titanium-nickel-tin (TiNiSn) alloy layer) and the aluminum layer. The intermediate layer (such as a layer having a chemical formula represented by $M_xNi_ySn_wAl_z$, wherein $0.10 \leq x \leq 0.25$, $0.10 \leq y \leq 0.25$, $0.6 \leq z \leq 0.75$, $0.01 \leq w \leq 0.10$, $x+y+z+w=1$, and M is Ti, Zr, or Hf) can serve as a second anti-corrosion layer in order to protect the aluminum layer. Furthermore, due to the intermediate layer, the adhesive strength between the first anti-corrosion layer and the aluminum layer can be improved. Therefore, the problem of the anti-corrosion layer peeling from the aluminum layer is minimized or eliminated.

According to embodiments of the disclosure, as shown in FIG. 1, the anti-corrosion structure 100 can include an aluminum layer 10, a first anti-corrosion layer 12 and an intermediate layer 14 disposed between the aluminum layer and the first anti-corrosion layer. The first anti-corrosion layer 12 can be a nickel-tin-containing alloy layer. The intermediate layer 14 can serve as a second anti-corrosion layer. In particular, the intermediate layer can be a nickel-tin-aluminum-containing alloy layer. Herein, the nickel-tin-containing alloy layer can include an alloy consisting of nickel and tin. Furthermore, the nickel-tin-containing alloy layer can further include other metal, such as titanium, zirconium, or hafnium. The nickel-tin-aluminum-containing alloy layer can include the alloy consisting of nickel, tin and aluminum. Furthermore, the nickel-tin-aluminum-containing alloy layer can further include other metal, such as titanium, zirconium, or hafnium. The aluminum layer 10 can have a thickness of about 100 μm to 5 mm (such as from about 200 μm to 3 mm, or from about 200 μm to 2 mm). The first anti-corrosion layer 12 can have a thickness of about 100 μm to 5 mm (such as from about 200 μm to 3 mm, or from about 200 μm to 2 mm). The intermediate layer 14 can have a thickness of about 1 μm to 300 μm (such as from about 5 μm to 180 μm, or from about 10 μm to 150 μm). When the thickness of the intermediate layer 14 is too thin, the first anti-corrosion layer 12 would be apt to peel off from the anti-corrosion structure 100. When the thickness of the intermediate layer 14 is too thick, the electrical properties of the whole anti-corrosion structure 100 would be reduced.

According to embodiments of the disclosure, the first anti-corrosion layer can be a titanium-nickel-tin-containing alloy layer, zirconium-nickel-tin-containing alloy layer, or hafnium-nickel-tin-containing alloy layer, such as titanium-nickel-tin (TiNiSn) alloy layer, zirconium-nickel-tin (ZrNiSn) alloy layer, or hafnium-nickel-tin (HfNiSn) alloy layer. In order to improve the electrical properties of the first anti-corrosion layer, the first anti-corrosion layer can be a antimony-doped nickel-tin-containing alloy layer. According to embodiments of the disclosure, the antimony within the antimony-doped nickel-tin-containing alloy layer can have an atomic percentage from about 0.01 atom % to 5 atom %, based on the total amount of antimony and tin of the antimony-doped nickel-tin-containing alloy layer. For example, the first anti-corrosion layer can be a antimony-doped titanium-nickel-tin (TiNiSn$_{1-a}$Sb$_a$) alloy layer, antimony-doped zirconium-nickel-tin (ZrNiSn$_{1-a}$Sb$_a$) alloy layer, or antimony-doped hafnium-nickel-tin (HfNiSn$_{1-a}$Sb$_a$) alloy layer, wherein 0.0001≤a≤0.05.

According to embodiments of the disclosure, the intermediate layer can have a chemical formula represented by M$_x$Ni$_y$Sn$_w$Al$_z$, wherein 0.10≤x≤0.25, 0.10≤y≤0.25, 0.6≤z≤0.75, 0.01≤w≤0.10, x+y+z+w=1, and M is Ti, Zr, or Hf. In addition, the intermediate layer can be a titanium-nickel-tin-aluminum-containing alloy layer. For example, the titanium-nickel-tin-aluminum-containing alloy layer can be a titanium-nickel-tin-aluminum alloy layer having a chemical formula represented by Ti$_x$Ni$_y$Sn$_w$Al$_z$, wherein 0.10≤x≤0.25, 0.10≤y≤0.25, 0.6≤z≤0.75, 0.01≤w≤0.10, and x+y+z+w=1. The intermediate layer can be a zirconium-nickel-tin-aluminum-containing alloy layer. For example, the zirconium-nickel-tin-aluminum-containing alloy layer can be a zirconium-nickel-tin-aluminum alloy layer having a chemical formula represented by Zr$_x$Ni$_y$Sn$_w$Al$_z$, wherein 0.10≤x≤0.25, 0.10≤y≤0.25, 0.6≤z≤0.75, 0.01≤w≤0.10 and x+y+z+w=1. The intermediate layer can be a hafnium-nickel-tin-aluminum-containing alloy layer. For example, the hafnium-nickel-tin-aluminum-containing alloy layer can be a zirconium-nickel-tin-aluminum alloy layer having a chemical formula represented by Hf$_x$Ni$_y$Sn$_w$Al$_z$, wherein 0.10≤x≤0.25, 0.10≤y≤0.25, 0.6≤z≤0.75, 0.01≤w≤0.10, and x+y+z+w=1.

According to embodiments of the disclosure, the method for fabricating the anti-corrosion structure includes bonding a nickel-tin-containing alloy sheet (such as a titanium-nickel-tin-containing alloy sheet, zirconium-nickel-tin-containing alloy sheet, or hafnium-nickel-tin-containing alloy sheet) with an aluminum sheet via a thermocompression bonding process to obtain the anti-corrosion structure of the disclosure. In particular, the temperature of the thermocompression bonding process can be from about 400° C. to 600° C. (such as from about 450° C. to 550° C.), the pressure of the thermocompression bonding process can be from about 0.5 ton to 5 ton (such as from about 1 ton to 3 ton), and the process time can be from about 0.1 hr to 10 hr (such as from about 1 hr to 5 hr). It should be noted that the thickness of the intermediate layer of the anti-corrosion structure can be adjusted via the temperature, pressure and process time of the thermocompression bonding process. In addition, before bonding the nickel-tin-containing alloy sheet with the aluminum sheet via the thermocompression bonding process, the nickel-tin-containing alloy sheet can be subjected to an annealing process, wherein the temperature of the annealing process can be from about 800° C. to 1050° C. (such as from about 850° C. to 950° C.).

Figure 2:
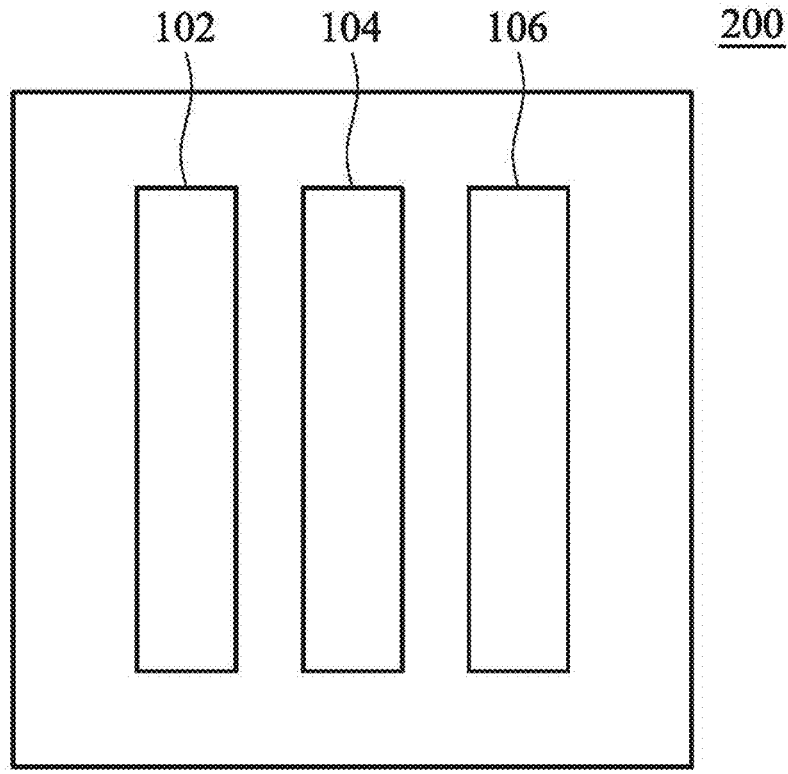
FIG. 2 is a schematic view of a fuel cell according to an embodiment of the disclosure.

According to embodiments of the disclosure, the disclosure also provides a fuel cell 200, as shown in FIG. 2. The fuel cell 200 can include a first bipolar plate 102, a membrane electrode assembly 104 and a second bipolar plate 106, wherein at least one of the first bipolar plate 102 and the second bipolar plate 106 is the aforementioned anti-corrosion structure of the disclosure. For example, the first bipolar plate 102 can be the anti-corrosion structure of the disclosure, the second bipolar plate 106 can be the anti-corrosion structure of the disclosure, or both the first bipolar plate 102 and the second bipolar plate 106 can be the anti-corrosion structure of the disclosure.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1

21.2 g titanium (Ti), 26.1 g nickel (Ni) and 52.7 g tin (Sn) were introduced into a muffle furnace to undergo a high-temperature melting process, obtaining a titanium-nickel-tin alloy block. Next, the titanium-nickel-tin alloy block was subjected to an annealing process, wherein the annealing process includes heating the titanium-nickel-tin alloy block at 1050° C. for 24 hr, and heating the titanium-nickel-tin alloy block at 900° C. for 240 hr. Next, the annealed titanium-nickel-tin alloy block was subjected to ball milling, obtaining an alloy powder. Next, the alloy powder was subjected to a thermocompression molding process, obtaining a titanium-nickel-tin (TiNiSn) circular sheet (having a thickness of about 1 mm and a radius of about 1 cm).

The titanium-nickel-tin (TiNiSn) circular sheet was cut into small pieces (having an area of 0.9 cm$^2$) and disposed in a corrosive solution (0.5M sulfuric acid) to evaluate the corrosion resistance thereof. The corrosion current density of the small piece of the titanium-nickel-tin (TiNiSn) sheet was measured against time, and the results are shown in Table 1.

TABLE 1

| time | 1 min | 5 min | 90 min |
|---|---|---|---|
| corrosion current (μA) | 0.64 | 0.024 | 0.016 |
| corrosion current density (μA/cm$^{-2}$) | 0.71 | 0.027 | 0.018 |

As shown in Table 1, the corrosion current density of the titanium-nickel-tin (TiNiSn) sheet was reduced to about 0.027 μA/cm$^{-2}$, after placing the titanium-nickel-tin (TiNiSn) sheet in the corrosive solution for 5 min. Furthermore, the corrosion current density of the titanium-nickel-tin (TiNiSn) sheet was reduced to about 0.018 μA/cm$^{-2}$, after placing the titanium-nickel-tin (TiNiSn) sheet in the corrosive solution for 90 min. It shows that the titanium-nickel-tin (TiNiSn) sheet of Preparation Example 1 exhibited corrosion resistance.

The electrical conductivity of the annealed titanium-nickel-tin (TiNiSn) sheet was measured. Next, after placing the titanium-nickel-tin (TiNiSn) sheet in the corrosive solution for 120 min, the electrical conductivity of the titanium-nickel-tin sheet was measured, and the results are shown in Table 2.

TABLE 2

|  | before corrosion | After soaking in corrosive solution for 120 min |
|---|---|---|
| electrical conductivity ($Scm^{-1}$) | 150 | 148 |

As shown in Table 2, the electrical conductivity of the annealed titanium-nickel-tin sheet is greater than the electrical conductivity ($100\ Scm^{-1}$) of a standard bipolar plate formulated by the United States Department of Energy (DOE). In addition, the electrical conductivity of the titanium-nickel-tin sheet before and after corrosion is substantially the same. It means that the electrical conductivity of the titanium-nickel-tin sheet is not affected by corrosion.

Preparation Example 2

33.96 g zirconium (Zr), 21.85 g nickel (Ni) and 44.19 g tin (Sn) were introduced into a muffle furnace to undergo a high-temperature melting process, obtaining a zirconium-nickel-tin alloy block. Next, the zirconium-nickel-tin alloy block was subjected to an annealing process, wherein the annealing process includes heating the zirconium-nickel-tin alloy block at 1050° C. for 24 hr, and heating the zirconium-nickel-tin alloy block at 900° C. for 240 hr. Next, the annealed zirconium-nickel-tin alloy block was subjected to ball milling, obtaining an alloy powder. Next, the alloy powder was subjected to a thermocompression molding process, obtaining a zirconium-nickel-tin (ZrNiSn) circular sheet (having a thickness of about 1 mm and a radius of about 1 cm).

Preparation Example 3

50.15 g hafnium (Hf), 16.49 g nickel (Ni) and 33.36 g tin (Sn) were introduced into a muffle furnace to undergo a high-temperature melting process, obtaining a hafnium-nickel-tin alloy block. Next, the hafnium-nickel-tin alloy block was subjected to an annealing process, wherein the annealing process includes heating the hafnium-nickel-tin alloy block at 1050° C. for 24 hr, and heating the hafnium-nickel-tin alloy block at 900° C. for 240 hr. Next, the annealed hafnium-nickel-tin alloy block was subjected to ball milling, obtaining an alloy powder. Next, the alloy powder was subjected to a thermocompression molding process, obtaining a hafnium-nickel-tin (HfNiSn) circular sheet (having a thickness of about 1 mm and a radius of about 1 cm).

Preparation Example 4

21.23 g titanium (Ti), 26.04 g nickel (Ni), 50.03 g tin (Sn) and 2.70 g antimony (Sb) were introduced into a muffle furnace to undergo a high-temperature melting process, obtaining a titanium-nickel-tin-antimony alloy block. Next, the titanium-nickel-tin-antimony alloy block was subjected to an annealing process, wherein the annealing process includes heating the titanium-nickel-tin-antimony alloy block at 1050° C. for 24 hr, and heating the titanium-nickel-tin-antimony alloy block at 900° C. for 240 hr. Next, the annealed titanium-nickel-tin-antimony alloy block was subjected to ball milling, obtaining an alloy powder. Next, the alloy powder was subjected to a thermocompression molding process, obtaining a titanium-nickel-tin-antimony ($TiNiSn_{0.95}Sb_{0.05}$) circular sheet (having a thickness of about 1 mm and a radius of about 1 cm).

Fabrication of Anti-Corrosion Structure

Example 1

Figure 3:
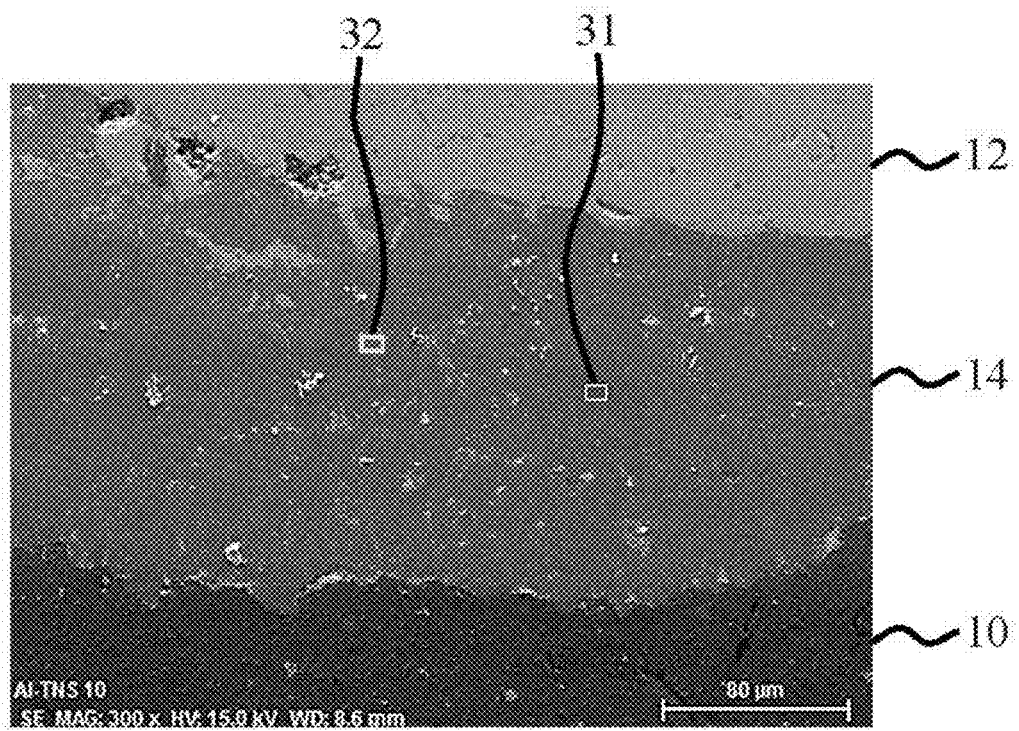
FIG. 3 is a scanning electron microscope (SEM) image of Anti-corrosion structure (1) in Example 1.

An aluminum sheet (having a thickness of about 5 mm and a radius of about 1 cm) was bonded with the titanium-nickel-tin (TiNiSn) sheet of Preparation Example 1 via a thermocompression bonding process, wherein the temperature of the thermocompression bonding process was about 500° C., the pressure of the thermocompression bonding process was about 1 ton, and the process time was about 1 hr, obtaining Anti-corrosion structure (1). Anti-corrosion structure (1) was examined using a scanning electron microscope (SEM), and the results are shown in FIG. 3. As shown in FIG. 3, when bonding the aluminum sheet and titanium-nickel-tin (TiNiSn) sheet via a thermocompression bonding process, an intermediate layer 14 was formed between the aluminum layer 10 and the titanium-nickel-tin (TiNiSn) alloy layer (serves as first anti-corrosion layer 12) via thermal diffusion bonding. The thickness, which was determined by scanning electron microscope image, of the intermediate layer 14 of Anti-corrosion structure (1) was about 90 μm.

Next, the elemental analyses of the intermediate layer 14 located at the region 31 and region 32 (as shown in FIG. 3) were performed using a scanning electron microscope/energy dispersive spectrometer (SEM-EDS), and the results are shown in Table 3.

TABLE 3

|  | element | | | |
|---|---|---|---|---|
|  | Al (atom %) | Ti (atom %) | Ni (atom %) | Sn (atom %) |
| region 31 | 69.03 | 14.13 | 15.36 | 1.48 |
| region 32 | 64.50 | 21.51 | 10.97 | 3.02 |

As shown in Table 3, the intermediate layer 14 is a titanium-nickel-tin-aluminum alloy layer (having a chemical formula represented by $Ti_xNi_ySn_wAl_z$, wherein x is 0.1413, y is 0.1536, z is 0.6903, and w is 0.0148 in the intermediate layer 14 located at the region 31; and, x is 0.2151, y is 0.1097, z is 0.645, and w is 0.0302 in the intermediate layer 14 located at the region 32). Accordingly, after bonding the aluminum sheet and the titanium-nickel-tin (TiNiSn) sheet via the thermocompression bonding process, the titanium-nickel-tin-aluminum alloy layer serving as the intermediate layer was formed via thermal diffusion bonding.

Example 2

Figure 4:
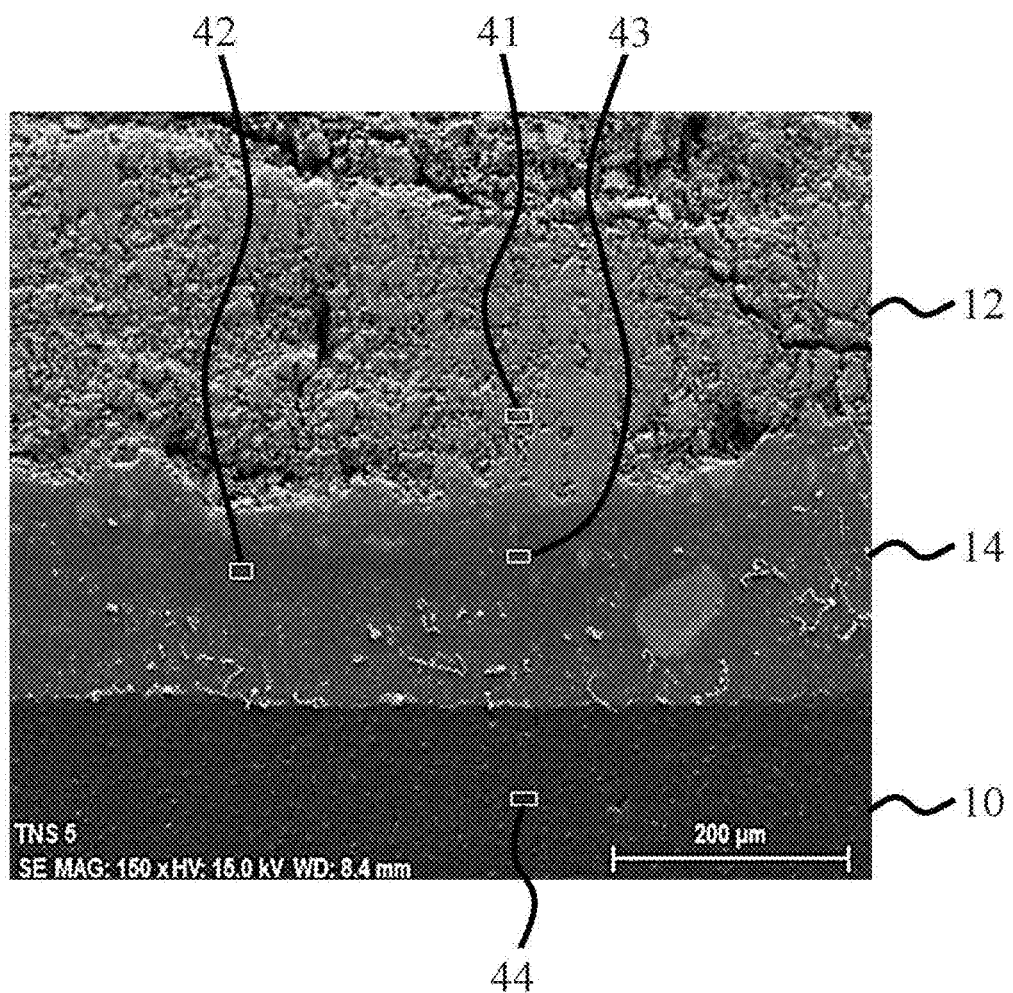
FIG. 4 is a scanning electron microscope (SEM) image of Anti-corrosion structure (2) in Example 2.

An aluminum sheet (having a thickness of about 5 mm and a radius of about 1 cm) was bonded with the titanium-nickel-tin (TiNiSn) sheet of Preparation Example 1 via a thermocompression bonding process, wherein the temperature of the thermocompression bonding process was about 500° C., the pressure of the thermocompression bonding process was about 1 ton, and the process time was about 2 hr, obtaining Anti-corrosion structure (2). Anti-corrosion structure (2) was examined using a scanning electron microscope (SEM), and the results are shown in FIG. 4. As shown in FIG. 4, when bonding the aluminum sheet and the titanium-nickel-tin (TiNiSn) sheet via a thermocompression bonding process, an intermediate layer 14 was formed between the aluminum layer and the titanium-nickel-tin (TiNiSn) alloy layer (serving as the first anti-corrosion layer 12) via thermal diffusion bonding. The thickness, which was determined by scanning electron microscope image, of the intermediate layer 14 of Anti-corrosion structure (2) was about 180 μm.

Next, the elemental analyses of the first anti-corrosion layer 12 located at the region 41, the intermediate layer 14 located at the regions 42 and 43 and the aluminum layer 10 located at the region 44 (as shown in FIG. 4) were performed using a scanning electron microscope/energy dispersive spectrometer (SEM-EDS), and the results are shown in Table 4.

TABLE 4

|  | element | | | |
| --- | --- | --- | --- | --- |
|  | Al (atom %) | Ti (atom %) | Ni (atom %) | Sn (atom %) |
| region 41 | 0 | 36.17 | 32.88 | 30.95 |
| region 42 | 65.96 | 14.55 | 15.02 | 4.48 |
| region 43 | 66.81 | 15.00 | 14.35 | 3.84 |
| region 44 | 99.49 | 0.15 | 0.23 | 0.12 |

As shown in Table 4, the intermediate layer 14 is a titanium-nickel-tin-aluminum alloy layer (having a chemical formula represented by $Ti_xNi_ySn_wAl_z$, wherein x is 0.1455, y is 0.1502, z is 0.6596, and w is 0.0448 in the intermediate layer 14 located at the region 42; and, x is 0.150, y is 0.1435, z is 0.6681, and w is 0.0384 in the intermediate layer 14 located at the region 43). Accordingly, after bonding the aluminum sheet and the titanium-nickel-tin (TiNiSn) sheet via the thermocompression bonding process, the titanium-nickel-tin-aluminum alloy layer serving as the intermediate layer was formed via thermal diffusion bonding.

Table 5 shows the thickness of the intermediate layers formed according to the process conditions of thermocompression bonding process as disclosed in Example 1 and Example 2.

TABLE 5

|  | temperature | pressure | process time | thickness |
| --- | --- | --- | --- | --- |
| Example 1 | 500° C. | 1 ton | 1 hr | About 90 μm |
| Example 2 | 500° C. | 1 ton | 2 hr | about 180 μm |

As shown in Table 5, the thickness of the intermediate layer is increased when lengthening the process time of the thermocompression bonding process.

Example 3

Figure 5:
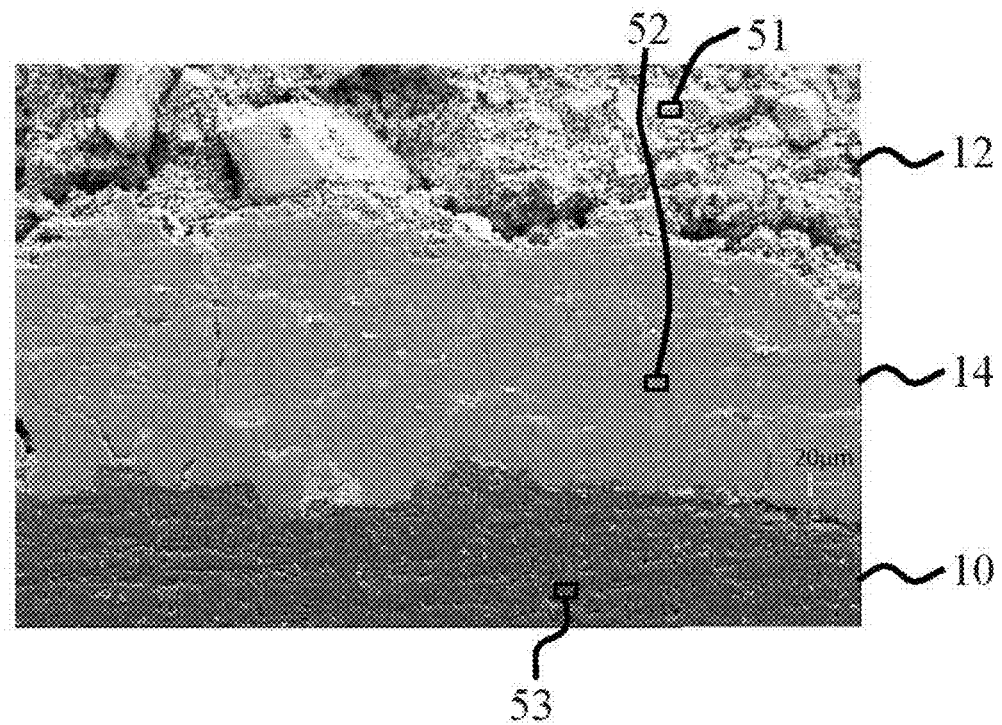
FIG. 5 is a scanning electron microscope (SEM) image of Anti-corrosion structure (3) in Example 3.

An aluminum sheet (having a thickness of about 5 mm and a radius of about 1 cm) was bonded with the zirconium-nickel-tin (ZrNiSn) sheet of Preparation Example 2 via a thermocompression bonding process, wherein the temperature of the thermocompression bonding process was about 500° C., the pressure of the thermocompression bonding process was about 1 ton, and the process time was about 1 hr, obtaining Anti-corrosion structure (3). Anti-corrosion structure (3) was examined using a scanning electron microscope (SEM), and the results are shown in FIG. 5. As shown in FIG. 5, when bonding the aluminum sheet and the zirconium-nickel-tin (ZrNiSn) sheet via a thermocompression bonding process, an intermediate layer 14 was formed between the aluminum layer 10 and the zirconium-nickel-tin (ZrNiSn) alloy layer (serving as the first anti-corrosion layer 12) via thermal diffusion bonding. The thickness, which was determined by scanning electron microscope image, of the intermediate layer 14 of Anti-corrosion structure (3) was about 100 μm.

Next, the elemental analyses of the first anti-corrosion layer 12 located at the region 51, the intermediate layer 14 located at the region 52 and the aluminum layer 10 located at the region 53 (as shown in FIG. 5) were performed using a scanning electron microscope/energy dispersive spectrometer (SEM-EDS), and the results are shown in Table 6.

TABLE 6

|  | element | | | |
| --- | --- | --- | --- | --- |
|  | Al (atom %) | Zr (atom %) | Ni (atom %) | Sn (atom %) |
| region 51 | 0.57 | 32.82 | 33.54 | 33.07 |
| region 52 | 63.91 | 12.60 | 14.85 | 8.63 |
| region 53 | 98.30 | 0.96 | 0.43 | 0.32 |

As shown in Table 4, the intermediate layer 14 is a zirconium-nickel-tin-aluminum alloy layer (having a chemical formula represented by $Zr_xNi_ySn_wAl_z$, wherein x is 0.1260, y is 0.1485, z is 0.6391, and w is 0.0863 in the intermediate layer 14 located at the region 52). Accordingly, after bonding the aluminum sheet and the zirconium-nickel-tin (ZrNiSn) sheet via the thermocompression bonding process, the titanium-nickel-tin-aluminum alloy layer serving as the intermediate layer was formed via thermal diffusion bonding.

Example 4

Figure 6:
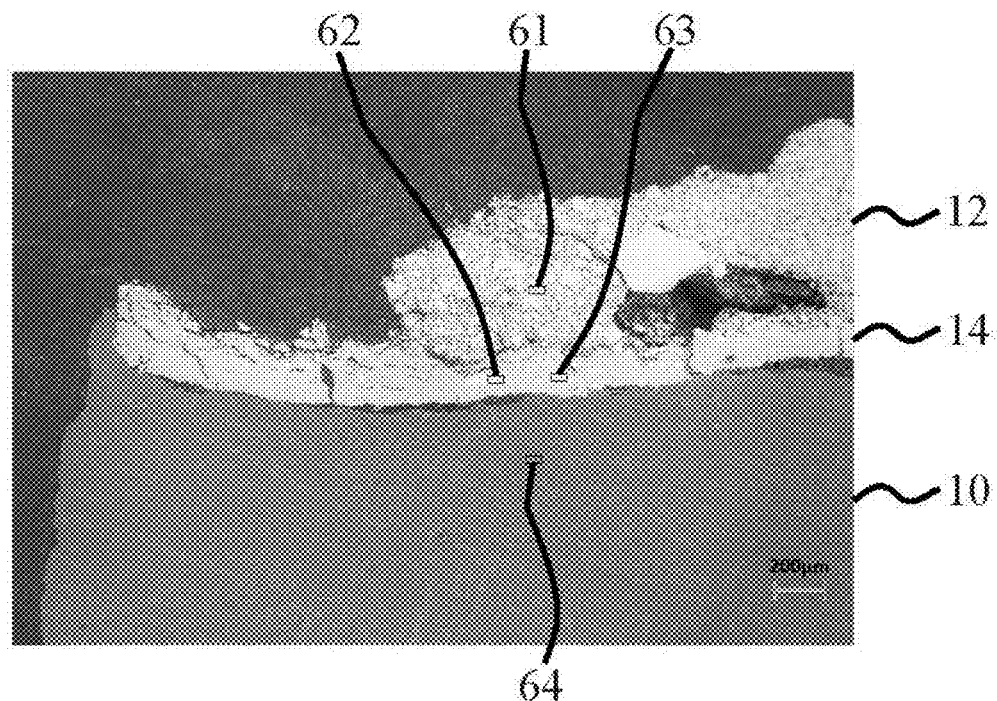
FIG. 6 is a scanning electron microscope (SEM) image of Anti-corrosion structure (4) in Example 4.

An aluminum sheet (having a thickness of about 5 mm and a radius of about 1 cm) was bonded with the hafnium-nickel-tin (HfNiSn) sheet of Preparation Example 3 via a thermocompression bonding process, wherein the temperature of the thermocompression bonding process was about 500° C., the pressure of the thermocompression bonding process was about 1 ton, and the process time was about 1 hr, obtaining Anti-corrosion structure (4). Anti-corrosion structure (4) was examined using a scanning electron microscope (SEM), and the results are shown in FIG. 6. As shown in FIG. 6, when bonding the aluminum sheet and the hafnium-nickel-tin (HfNiSn) sheet via a thermocompression bonding process, an intermediate layer 14 was formed between the aluminum layer 10 and the hafnium-nickel-tin (HfNiSn) alloy layer (serving as the first anti-corrosion layer 12) via thermal diffusion bonding. The thickness, which was determined by scanning electron microscope image, of the intermediate layer 14 of Anti-corrosion structure (4) was about 150 μm.

Next, the elemental analyses of the first anti-corrosion layer 12 located at the region 61, the intermediate layer 14 located at the regions 62 and 63 and the aluminum layer 10 located at the region 64 (as shown in FIG. 6) were performed using a scanning electron microscope/energy dispersive spectrometer (SEM-EDS), and the results are shown in Table 7.

TABLE 7

|  | element | | | |
| --- | --- | --- | --- | --- |
|  | Al (atom %) | Hf (atom %) | Ni (atom %) | Sn (atom %) |
| region 61 | 0 | 37.01 | 32.80 | 30.19 |
| region 62 | 67.51 | 11.80 | 13.95 | 6.73 |

TABLE 7-continued

| | element | | | |
|---|---|---|---|---|
| | Al (atom %) | Hf (atom %) | Ni (atom %) | Sn (atom %) |
| region 63 | 70.81 | 11.88 | 13.40 | 3.90 |
| region 64 | 100 | 0 | 0 | 0 |

As shown in Table 7, the intermediate layer 14 is a hafnium-nickel-tin-aluminum alloy layer (having a chemical formula represented by $Hf_xNi_ySn_wAl_z$, wherein x is 0.1180, y is 0.1395, z is 0.6751, and w is 0.0673 in the intermediate layer 14 located at the region 62; and, x is 0.1188, y is 0.1340, z is 0.7081, and w is 0.0390 in the intermediate layer 14 located at the region 63). Accordingly, after bonding the aluminum sheet and the hafnium-nickel-tin (HfNiSn) sheet via the thermocompression bonding process, the titanium-nickel-tin-aluminum alloy layer serving as the intermediate layer was formed via thermal diffusion bonding.

Example 5

Figure 7:
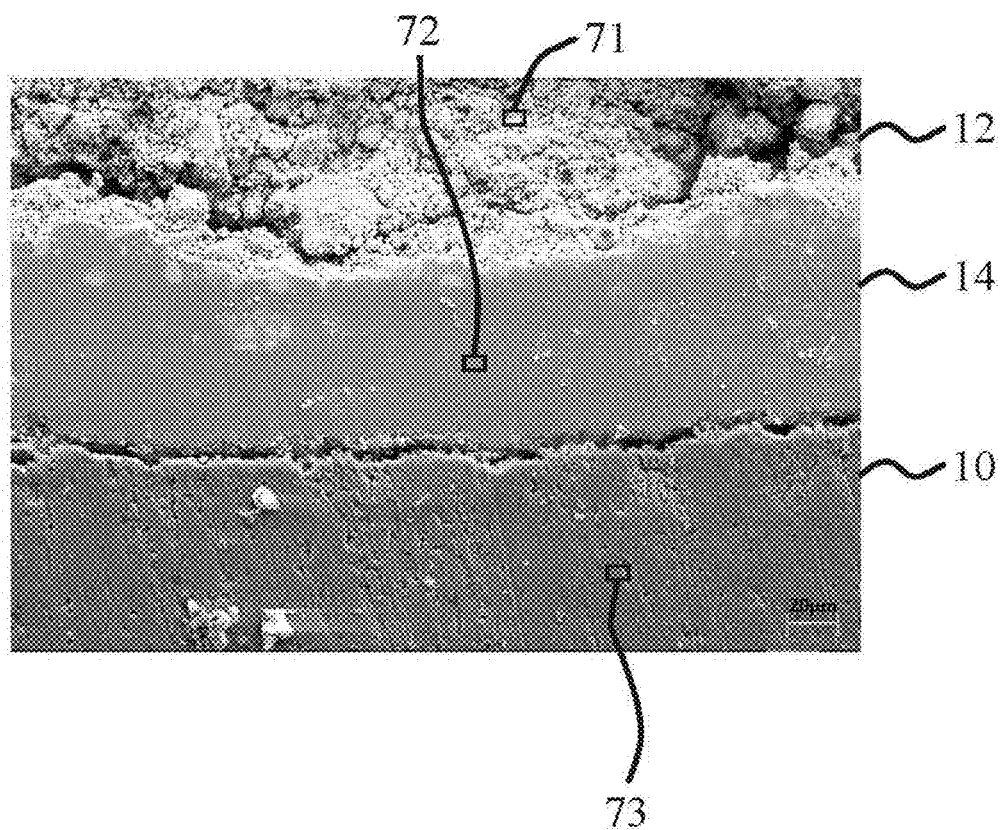
FIG. 7 is a scanning electron microscope (SEM) image of Anti-corrosion structure (5) in Example 5.

An aluminum sheet (having a thickness of about 5 mm and a radius of about 1 cm) was bonded with the titanium-nickel-tin-antimony ($TiNiSn_{0.95}Sb_{0.05}$) sheet of Preparation Example 4 via a thermocompression bonding process, wherein the temperature of the thermocompression bonding process was about 500° C., the pressure of the thermocompression bonding process was about 1 ton, and the process time was about 1 hr, obtaining Anti-corrosion structure (5). Anti-corrosion structure (5) was examined using a scanning electron microscope (SEM), and the results are shown in FIG. 7. As shown in FIG. 7, when bonding the aluminum sheet and the titanium-nickel-tin-antimony ($TiNiSn_{0.95}Sb_{0.05}$) sheet via a thermocompression bonding process, an intermediate layer 14 was formed between the aluminum layer 10 and the titanium-nickel-tin-antimony ($TiNiSn_{0.95}Sb_{0.05}$) alloy layer (serving as the first anti-corrosion layer 12) via thermal diffusion bonding. The thickness, which was determined by scanning electron microscope image, of the intermediate layer 14 of Anti-corrosion structure (5) was about 100 μm.

Next, the elemental analyses of the first anti-corrosion layer 12 located at the region 71, the intermediate layer 14 located at the region 72 (as shown in FIG. 7) and the aluminum layer 10 located at the region 73 were performed using a scanning electron microscope/energy dispersive spectrometer (SEM-EDS), and the results are shown in Table 8.

TABLE 8

| | element | | | | |
|---|---|---|---|---|---|
| | Al (atom %) | Ti (atom %) | Ni (atom %) | Sn (atom %) | Sb (atom %) |
| region 71 | 0.75 | 35.98 | 30.39 | 31.45 | 1.43 |
| region 72 | 66.66 | 16.43 | 13.80 | 3.02 | 0.09 |
| region 73 | 99.23 | 0.26 | 0.23 | 0.25 | 0.04 |

As shown in Table 8, the intermediate layer 14 is a hafnium-nickel-tin-antimony-aluminum alloy layer (having a chemical formula represented by $Ti_xNi_ySn_wSb_aAl_z$, wherein x is 0.1643, y is 0.1380, z is 0.6666, w is 0.0302 and a is 0.0009 in the intermediate layer 14 located at the region 72). Accordingly, after bonding the aluminum sheet and the titanium-nickel-tin-antimony ($TiNiSn_{0.95}Sb_{0.05}$) sheet via the thermocompression bonding process, the titanium-nickel-tin-antimony-aluminum alloy layer serving as the intermediate layer was formed via thermal diffusion bonding.

Test of Adhesive Strength

Example 6

Anti-corrosion structure (1) of Example 1 was cut into 2 mm×2 mm square pieces. The adhesive strength between the aluminum layer and the titanium-nickel-tin alloy layer of Anti-corrosion structure (1) was measured according to ASTM-F1269 via a thruster. As the result, the titanium-nickel-tin alloy layer was not peeled off from Anti-corrosion structure (1) when 50 kg of trust was applied to the titanium-nickel-tin alloy layer. Accordingly, due to the intermediate layer of the disclosure formed between the aluminum layer and the anti-corrosion layer (such as titanium-nickel-tin alloy layer), the adhesive strength between the anti-corrosion layer and the aluminum layer can be improved, thereby solving the problem of the anti-corrosion layer being apt to peel off from the aluminum layer.

It will be clear that various modifications and variations can be made to the disclosed methods and materials. It is intended that the specification and examples be considered as exemplary only, with the true scope of the disclosure being indicated by the following claims and their equivalents.

What is claimed is:

1. An anti-corrosion structure, comprising:
   an aluminum layer;
   a first anti-corrosion layer, wherein the first anti-corrosion layer is a nickel-tin-containing alloy layer; and
   an intermediate layer disposed between the aluminum layer and the first anti-corrosion layer, wherein the intermediate layer is a nickel-tin-aluminum-containing alloy layer.

2. The anti-corrosion structure as claimed in claim 1, wherein the first anti-corrosion layer is a titanium-nickel-tin-containing alloy layer, a zirconium-nickel-tin-containing alloy layer, or a hafnium-nickel-tin-containing alloy layer.

3. The anti-corrosion structure as claimed in claim 2, wherein the intermediate layer has a structure represented by $M_xNi_ySn_wAl_z$, wherein $0.10 \le x \le 0.25$, $0.10 \le y \le 0.25$, $0.6 \le z \le 0.75$, $0.01 \le w \le 0.10$, $x+y+z+w=1$, and M is Ti, Zr, or Hf.

4. The anti-corrosion structure as claimed in claim 1, wherein the first anti-corrosion layer is a antimony-doped nickel-tin-containing alloy layer.

5. The anti-corrosion structure as claimed in claim 4, wherein the antimony within the first anti-corrosion layer has an atomic percentage from 0.01 atom % to 5 atom %, based on the total amount of antimony and tin.

6. The anti-corrosion structure as claimed in claim 1, wherein the first anti-corrosion layer is a titanium-nickel-tin-containing alloy layer.

7. The anti-corrosion structure as claimed in claim 6, wherein the first anti-corrosion layer is antimony-doped titanium-nickel-tin-containing alloy layer.

8. The anti-corrosion structure as claimed in claim 6, wherein the intermediate layer is a titanium-nickel-tin-aluminum-containing alloy layer.

9. The anti-corrosion structure as claimed in claim 8, wherein the titanium-nickel-tin-aluminum-containing alloy layer has a structure represented by $Ti_xNi_ySn_wAl_z$, wherein $0.10 \leq x \leq 0.25$, $0.10 \leq y \leq 0.25$, $0.6 \leq z \leq 0.75$, $0.01 \leq w \leq 0.10$, and $x+y+z+w=1$.

10. The anti-corrosion structure as claimed in claim 1, wherein the first anti-corrosion layer is a zirconium-nickel-tin-containing alloy layer.

11. The anti-corrosion structure as claimed in claim 10, wherein the first anti-corrosion layer is a antimony-doped zirconium-nickel-tin-containing alloy layer.

12. The anti-corrosion structure as claimed in claim 10, wherein the intermediate layer is a zirconium-nickel-tin-aluminum-containing alloy layer.

13. The anti-corrosion structure as claimed in claim 12, wherein the zirconium-nickel-tin-aluminum-containing alloy layer has a structure represented by $Zr_xNi_ySn_wAl_z$, wherein $0.10 \leq x \leq 0.25$, $0.10 \leq y \leq 0.25$, $0.6 \leq z \leq 0.75$, $0.01 \leq w \leq 0.10$, and $x+y+z+w=1$.

14. The anti-corrosion structure as claimed in claim 1, wherein the first anti-corrosion layer is a hafnium-nickel-tin-containing alloy layer.

15. The anti-corrosion structure as claimed in claim 14, wherein the first anti-corrosion layer is a antimony-doped hafnium-nickel-tin-containing alloy layer.

16. The anti-corrosion structure as claimed in claim 14, wherein the intermediate layer is a hafnium-nickel-tin-aluminum-containing alloy layer.

17. The anti-corrosion structure as claimed in claim 16, wherein the hafnium-nickel-tin-aluminum-containing alloy layer has a structure represented by $Hf_xNi_ySn_wAl_z$, wherein $0.10 \leq x \leq 0.25$, $0.10 \leq y \leq 0.25$, $0.6 \leq z \leq 0.75$, $0.01 \leq w \leq 0.10$, and $x+y+z+w=1$.

18. The anti-corrosion structure as claimed in claim 16, wherein the intermediate layer has a thickness of 1 μm to 300 μm.

19. The anti-corrosion structure as claimed in claim 16, wherein the intermediate layer serves as a second anti-corrosion layer.

20. A fuel cell, comprising:
a bipolar plate, wherein the bipolar plate is the anti-corrosion structure as claimed in claim 1.

* * * * *